US012585387B2

(12) United States Patent
Liu et al.

(10) Patent No.: US 12,585,387 B2
(45) Date of Patent: Mar. 24, 2026

(54) CLOCK DOMAIN PHASE ADJUSTMENT FOR MEMORY OPERATIONS

(71) Applicants: Advanced Micro Devices, Inc., Santa Clara, CA (US); ATI Technologies ULC, Markham (CA)

(72) Inventors: Tsun-Ho Liu, Bedford, MA (US); Anwar Parvez Kashem, Sudbury, MA (US); Pouya Najafi Ashtiani, Toronto (CA); Gershom Birk, Coquitlam (CA); David Da Wei Lin, Westborough, MA (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 26 days.

(21) Appl. No.: 18/190,724

(22) Filed: Mar. 27, 2023

(65) Prior Publication Data

US 2024/0329839 A1 Oct. 3, 2024

(51) Int. Cl.
| | |
|---|---|
| *G06F 3/00* | (2006.01) |
| *G06F 1/08* | (2006.01) |
| *G06F 3/06* | (2006.01) |
| *G06F 12/00* | (2006.01) |
| *H04L 7/00* | (2006.01) |

(52) U.S. Cl.
CPC .............. *G06F 3/0611* (2013.01); *G06F 1/08* (2013.01); *G06F 3/0656* (2013.01); *G06F 3/0673* (2013.01); *H04L 7/0016* (2013.01)

(58) Field of Classification Search
CPC .... G06F 3/0611; G06F 3/0656; G06F 3/0673; G06F 1/08; H04L 7/0016

USPC .......................................................... 711/105
See application file for complete search history.

(56) References Cited

U.S. PATENT DOCUMENTS

| | | | | | |
|---|---|---|---|---|---|
| 5,838,990 | A * | 11/1998 | Park | .................... | G11C 11/4076 |
| | | | | | 710/14 |
| 6,337,832 | B1 * | 1/2002 | Ooishi | ................. | G11C 7/1045 |
| | | | | | 365/219 |
| 6,339,552 | B1 * | 1/2002 | Taruishi | ............... | G11C 7/1093 |
| | | | | | 365/228 |
| 6,636,110 | B1 * | 10/2003 | Ooishi | ....................... | G06F 1/10 |
| | | | | | 327/295 |
| 7,081,782 | B2 * | 7/2006 | Kizer | ......................... | H03L 7/07 |
| | | | | | 327/158 |
| 8,386,722 | B1 * | 2/2013 | Wang | ......................... | G06F 1/12 |
| | | | | | 711/202 |

(Continued)

OTHER PUBLICATIONS

2025.*

*Primary Examiner* — Sheng Jen Tsai
(74) *Attorney, Agent, or Firm* — FIG. 1 Patents

(57) ABSTRACT

Clock domain phase adjustment techniques and systems for memory operations are described. In one example, a physical memory is communicatively coupled to a physical layer via a first clock domain and a memory controller is communicatively coupled to the physical layer via a second clock domain that is different than the first clock domain. A buffer is implemented in the physical layer. The buffer is configured to set a phase adjustment for a latency setting between the first and second clock domains. The phase adjustment is based on whether a mismatch has occurred in data output by the buffer to the memory controller based on a comparison to the latency setting.

20 Claims, 6 Drawing Sheets

400 ⟶

(56)         References Cited

U.S. PATENT DOCUMENTS

| | | | | |
|---|---|---|---|---|
| 10,353,457 | B1 * | 7/2019 | Lam ....................... | G06F 1/3275 |
| 11,372,703 | B1 * | 6/2022 | Liberty ............... | G06F 13/1668 |
| 2001/0052808 | A1 * | 12/2001 | Hamamoto ............ | H03K 5/135 |
| | | | | 327/291 |
| 2002/0141280 | A1 * | 10/2002 | Hamamoto .......... | G11C 7/1066 |
| | | | | 365/233.1 |
| 2003/0081490 | A1 * | 5/2003 | Nagasawa ........ | G11C 29/12005 |
| | | | | 365/230.03 |
| 2003/0117885 | A1 * | 6/2003 | Hasegawa ............ | G11C 7/1066 |
| | | | | 365/233.1 |
| 2004/0148482 | A1 * | 7/2004 | Grundy .............. | G06F 13/4256 |
| | | | | 711/104 |
| 2004/0189352 | A1 * | 9/2004 | Jeon ................. | H03K 19/09429 |
| | | | | 327/112 |
| 2009/0150635 | A1 * | 6/2009 | Shibata .................... | G11C 7/10 |
| | | | | 711/E12.002 |
| 2010/0135090 | A1 * | 6/2010 | Gomm ................. | H03L 7/0814 |
| | | | | 365/194 |
| 2012/0233395 | A1 * | 9/2012 | Smith ................. | G06F 13/4239 |
| | | | | 711/E12.001 |
| 2014/0192583 | A1 * | 7/2014 | Rajan ....................... | G11C 7/10 |
| | | | | 365/63 |
| 2015/0221355 | A1 * | 8/2015 | Vo ........................ | G11C 7/1093 |
| | | | | 365/194 |
| 2016/0141016 | A1 * | 5/2016 | Lin ....................... | G11C 7/1066 |
| | | | | 365/233.11 |
| 2016/0141017 | A1 * | 5/2016 | Lin ....................... | G11C 11/406 |
| | | | | 365/230.02 |
| 2019/0260380 | A1 * | 8/2019 | Carlough ................ | H03L 7/085 |
| 2020/0075069 | A1 * | 3/2020 | Kim ........................ | G11C 5/04 |
| 2021/0303020 | A1 * | 9/2021 | Aquil ........................ | G06F 1/08 |

* cited by examiner

100 ⟶

200 ⟍

300 ⟍

302 ⟍

400

Reference Clock 504

Memory Controller 106

First Clock Domain 118

Delay Line 508

Physical Layer 108

Phase Adjustment Module 126

Phase Detector 502

Buffer 122 (e.g., FIFO)

Memory Clock 506

Latency Setting 124

Phase Adjustment 128

Physical Memory 110

Dynamic Random Access Memory 112

Second Clock Domain 120

700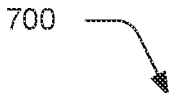

---

702
Detect a mismatch has occurred in data output by a buffer to a memory controller with respect to a latency setting used to control data output from the buffer

---

704
Set a subsequent latency setting of the buffer based on a phase adjustment as a margin calculated between the latency setting and the data output

---

706
Control subsequent data output of the buffer to the memory controller based on the subsequent latency setting

CLOCK DOMAIN PHASE ADJUSTMENT FOR MEMORY OPERATIONS

BACKGROUND

Physical memory such as dynamic random access memory and associated memory controllers are employed by computing systems to manage data storage as well as how this data is made available to processing devices, e.g., central processing units, graphics processing units, auxiliary processing units, parallel accelerated processor, and so forth. As such, efficiency in data storage and access to this data directly affects the operation of these devices, examples of which include processing speed, bandwidth, and power consumption. Conventional techniques, however, when confronted with memory operations involving multiple clock domains introduce latency, thereby hindering performance of the memory operations as well as device operations that rely on data that is a subject of the memory operations.

BRIEF DESCRIPTION OF THE DRAWINGS

The detailed description is described with reference to the accompanying figures.

FIG. 7 depicts a procedure in an example implementation of clock domain phase adjustment for memory operations.

DETAILED DESCRIPTION

Overview

Figure 1:
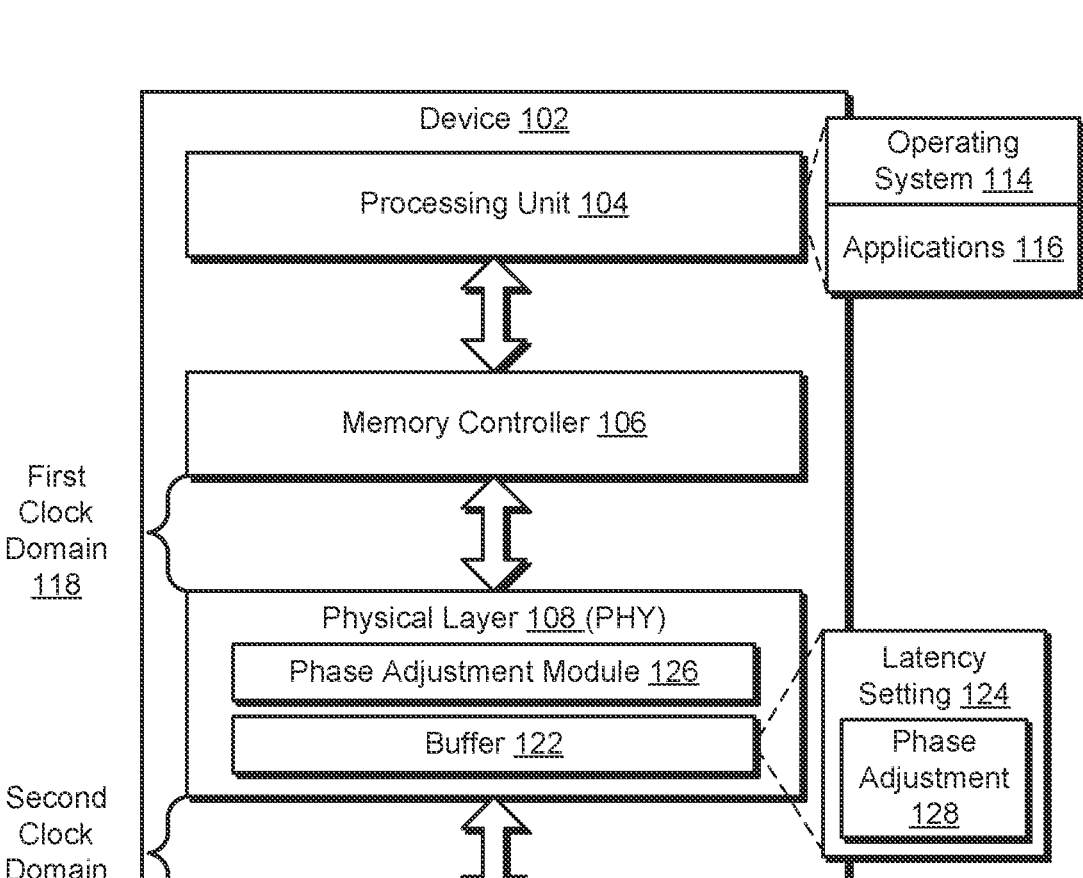
FIG. 1 is a block diagram of a non-limiting example system configured to employ clock domain phase adjustment techniques for memory operations.

Efficiency of data access has a direct effect on efficiency of overall device operation. Consider a scenario in which data stored by a physical memory (e.g., a dynamic random access memory) is subject of a read operation communicated from a memory controller. The memory controller and physical memory are communicatively coupled to a physical layer, also referred to as a "phy." In real world scenarios, the memory controller is implemented as part of a first clock domain that is different than a second clock domain used to implement the physical memory. As such, the physical layer is tasked with support of a communicative coupling between these domains. Conventional techniques to do so, however, introduce latency and therefore hinder device operation.

In one example, the physical layer causes the physical memory to push data subject to a read operation received from the memory controller to the buffer as part of a faster second clock domain. Data is then output from the buffer to the memory controller as part of a slower first clock domain.

A latency setting is employed by the buffer to control "when" the data is made available to the memory controller. The latency setting, for instance, defines a maximum read latency defined in the first clock domain as a minimum wait time before data in the buffer is made available to the memory controller.

The memory controller, for instance, is configurable to receive a predefined amount of data (i.e., a threshold number of items) in response to the read operation, e.g., four bits. Failure to provide this amount of data causes errors and inefficiencies in repeated requests to correct these errors. Accordingly, in conventional scenarios the latency setting is defined to include an additional amount (e.g., a single clock cycle in the slower first clock domain) to ensure this data in the buffer is ready to be consumed by the memory controller. However, this introduces read latency and hinders device performance.

To solve these problems, techniques and systems are described that support clock domain phase adjustment for memory operations. As part of this, a phase adjustment is calculated that is usable to reduce latency and respond to changes in device operation. A physical layer, for instance, is used to communicatively couple a memory controller with a physical memory. A communicative coupling between the memory controller and the physical layer operates as part of a first clock domain. A communicative coupling between the physical layer and the physical memory, however, operates as part of a second clock domain that is different than the first clock domain, e.g., is faster. Accordingly, the physical layer includes a buffer (e.g., a first-in, first-out buffer) as a "read data" buffer as part of performing read operations in order to support communication between these different clock domains.

In the techniques described herein, a phase alignment is determined between the domains and used as a basis to align the clock domains. The phase adjustment, for instance, is included as part of the latency setting to align edges of the first clock domain with edges of the second clock domain that are fixed. As a result, the additional amount (e.g., the single clock cycle in the first clock domain) involved in conventional techniques is not added to the latency setting, thereby improving memory operation efficiency. This is performable in a variety of ways.

In a first example, the phase adjustment is detected based on a change to a latency setting, which causes a change to round-trip latency of a read operation, including a physical memory clock, command bus, stroke, and other associated signals. This is performed by changing an amount of the phase adjustment and a comparison of a resulting output from the buffer. This is performed until a mismatch is detected by the buffer, e.g., an amount of time used by the buffer to output the data does not correspond to an amount of time set by the latency setting having the amount of phase adjustment. A margin measured in this mismatch is then subsequently used as a phase adjustment for a subsequent latency setting. This technique is performable over a plurality of iterations, e.g., to address changing conditions such as heat, voltage, and so forth.

In a second example, a phase detector is included as part of hardware of the physical layer. The phase detector operates at the second clock domain, which is faster than the first clock domain in this example, to detect a phase relationship of the first and second clock domains to each other. Based on this, a phase adjustment is calculated based on the phase relationship (e.g., to align edges of the clock signals, one to another) and used as part of the latency setting to control output of data from the buffer of the physical layer to the memory controller. This technique is also repeatable over a plurality of iterations to dynamically address changes in device operation and thus improve operation of the device. A variety of other instances are also contemplated, examples of which are described in the following discussion and shown using corresponding figures.

In some aspects, the techniques described herein relate to a device including a physical memory communicatively coupled to a physical layer via a first clock domain; a memory controller communicatively coupled to the physical layer via a second clock domain that is different than the first clock domain, and a buffer implemented in the physical layer, the buffer configured to set a phase adjustment for a latency setting between the first and second clock domains, the phase adjustment based on whether a mismatch has occurred in data output by the buffer to the memory controller based on a comparison to the latency setting.

In some aspects, the techniques described herein relate to a device, wherein the mismatch is based on comparing an amount of time taken by the data output and an amount of time specified by the latency setting.

In some aspects, the techniques described herein relate to a device, wherein the buffer is configured to change the phase adjustment and detect whether the mismatch has occurred over a plurality of iterations.

In some aspects, the techniques described herein relate to a device, wherein the buffer is configured to measure a margin based on the comparison of an amount of time specified by the latency setting and an amount of time used as part of the data output.

In some aspects, the techniques described herein relate to a device, wherein the buffer is configured to add the margin as a phase adjustment as part of a subsequent latency setting based on detection of the mismatch.

In some aspects, the techniques described herein relate to a device, wherein the second clock domain has a clock speed that is greater than a clock speed of the first clock domain.

In some aspects, the techniques described herein relate to a device, wherein the second clock domain is fixed and the phase adjustment as part of the latency setting is configured to align the first clock domain with the second clock domain.

In some aspects, the techniques described herein relate to a device, wherein the phase adjustment is configured to align an edge of a clock signal in the first clock domain with an edge of a clock signal in the second clock domain as part of the latency setting.

In some aspects, the techniques described herein relate to a device, wherein the buffer is implemented as a first-in, first-out buffer.

In some aspects, the techniques described herein relate to a device, wherein the physical memory is configured as a dynamic random access memory.

In some aspects, the techniques described herein relate to a device including a physical memory communicatively coupled to a physical layer via a first clock domain, a memory controller communicatively coupled to the physical layer via a second clock domain, and a buffer and a phase adjustment module implemented in the physical layer, the phase adjustment module configured to detect a phase relationship of the first clock domain to the second clock domain, and set a latency setting used as a basis to control data output from the buffer to the memory controller, the latency setting set using a phase adjustment generated based on the phase relationship.

In some aspects, the techniques described herein relate to a device, the phase adjustment module including a phase detector implemented in hardware of the physical layer and operational in the first clock domain to detect the phase relationship.

In some aspects, the techniques described herein relate to a device, wherein the phase adjustment is configured to align an edge of a clock signal in the first clock domain with an edge of a clock signal in the second clock domain.

In some aspects, the techniques described herein relate to a device, wherein the buffer is implemented as a first-in, first-out buffer and the physical memory is configured as dynamic random access memory.

In some aspects, the techniques described herein relate to a device, wherein the second clock domain is fixed and the phase adjustment is configured to align the first clock domain with the second clock domain.

In some aspects, the techniques described herein relate to a method including: \ detecting a mismatch has occurred in data output by a buffer to a memory controller with respect to a latency setting used to control data output from the buffer, the buffer implemented in a physical layer that communicatively couples a first clock domain used by the memory controller with a second clock domain used by physical memory, setting a subsequent latency setting of the buffer based on a phase adjustment as a margin calculated between the latency setting and the data output, and controlling subsequent data output of the buffer to the memory controller based on the subsequent latency setting.

In some aspects, the techniques described herein relate to a method, wherein the mismatch is based on a lack of a threshold number of items in the buffer as available for output to the memory controller in response to a read operation from the memory controller.

In some aspects, the techniques described herein relate to a method, wherein the subsequent latency setting is set by adding the margin to the latency setting.

In some aspects, the techniques described herein relate to a method, wherein the second clock domain has a clock speed that is greater than a clock speed of the first clock domain.

In some aspects, the techniques described herein relate to a method, wherein the buffer is implemented as a first-in, first-out buffer and the physical memory is configured as dynamic random access memory.

FIG. 1 is a block diagram of a non-limiting example system 100 configured to employ clock domain phase adjustment techniques for memory operations. The system 100 includes a device 102 having a processing unit 104 (e.g., a central processing unit, a graphics processing unit, an auxiliary processing unit), a memory controller 106, a physical layer 108, and a physical memory 110 (e.g., volatile or nonvolatile memory) that are communicatively coupled, one to another, e.g., via a bus. An example of physical memory 110 is illustrated as dynamic random access memory 112, i.e., DRAM.

The device 102 is configurable in a variety of ways. Examples of which include without limitation computing devices, servers, mobile devices (e.g., wearables, mobile phones, tablets, laptops), processors (e.g., graphics processing units, central processing units, and accelerators), digital signal processors, disk array controllers, hard disk drive host adapters, memory cards, solid-state drives, wireless communications hardware connections, Ethernet hardware connections, switches, bridges, network interface controllers, and other apparatus configurations. Further the device 102 is configurable as part of another device that incorporates this computational functionality, e.g., vehicles. It is to be appreciated that in various implementations, the device 102 is configured as any one or more of those devices listed just above and/or a variety of other devices without departing from the spirit or scope of the described techniques.

In the illustrated example, the processing unit 104 executes software (e.g., an operating system 114, applications 116, etc.) to issue memory operations to the memory controller 106. Memory operations are configurable to cause storage (e.g., programming) of data to physical memory 110 as a write operation or read data from the physical memory 110 as a read operation. The memory controller 106, in one or more examples, is part of a chipset or integrated within the processing unit 104. The memory controller 106 is configured to manage data transfer between the processing unit 104 and the physical memory 110. The physical memory 110 is configurable as actual random access hardware on a printed circuit board as a memory module.

The memory controller 106 is communicatively coupled to the physical layer 108 via a first clock domain 118. The first clock domain 118, for instance, is based on a reference clock signal utilized by the processing unit 104 to coordinate operations. The physical memory 110, on the other hand, is communicatively coupled to the physical layer 108 via a second clock domain 120, which in this instance is different than the first clock domain 118. The second clock domain 120, for instance, is operable to employ a clock signal having a greater speed (i.e., clock rate) than that used by the first clock domain 118.

The physical layer 108 (PHY), in one or more examples, refers to a hardware-level implementation of electrical, mechanical, and timing characteristics of an interface between the memory controller 106 (e.g., as a microcontroller) and the physical memory 110, e.g., dynamic random access memory 112. The electrical characteristics include voltage levels, signaling, and termination schemes. The mechanical characteristics include physical connections including shape, size, and layout of connectors with the physical memory 110 and corresponding socket on a motherboard of the device 102. Timing characteristics involve synchronization of data transfer between the memory controller 106 and the physical memory 110.

Thus, the physical layer 108 is configured to support communication between the memory controller 106 and the physical memory 110, e.g., as a dedicated integrated circuit. To support this, a buffer 122 (e.g., configurable as a first-in, first out buffer in hardware) is utilized as a "read buffer" to store data obtained from the physical memory 110 in response to a read operation and output the data ("pop out") to the memory controller 106. As a result, the buffer 122 provides data communication support between the first and second clock domains 118, 120.

The physical layer 108, for instance, receives a memory operation (e.g., a read operation) from the memory controller 106 within the first clock domain 118. This operation is communicated by the physical layer 108 to the physical memory 110. This causes the physical memory 110 to push data subject to the read operation to the buffer 122 within the second clock domain 120, which is faster than the first clock domain 118. This data is then output by the buffer 122 to the memory controller 106 within the first clock domain 118.

The buffer 122 is configured to employ a latency setting 124 to control "when" the data is made available to the memory controller 106. The latency setting 124, for instance, defines a maximum read latency defined in the first clock domain 118 as a minimum wait time before data in the buffer is made available to the memory controller 106. In this way, the buffer 122 is configured to support the different rates of the clock signals of the first and second clock domains 118, 120.

Figure 2:
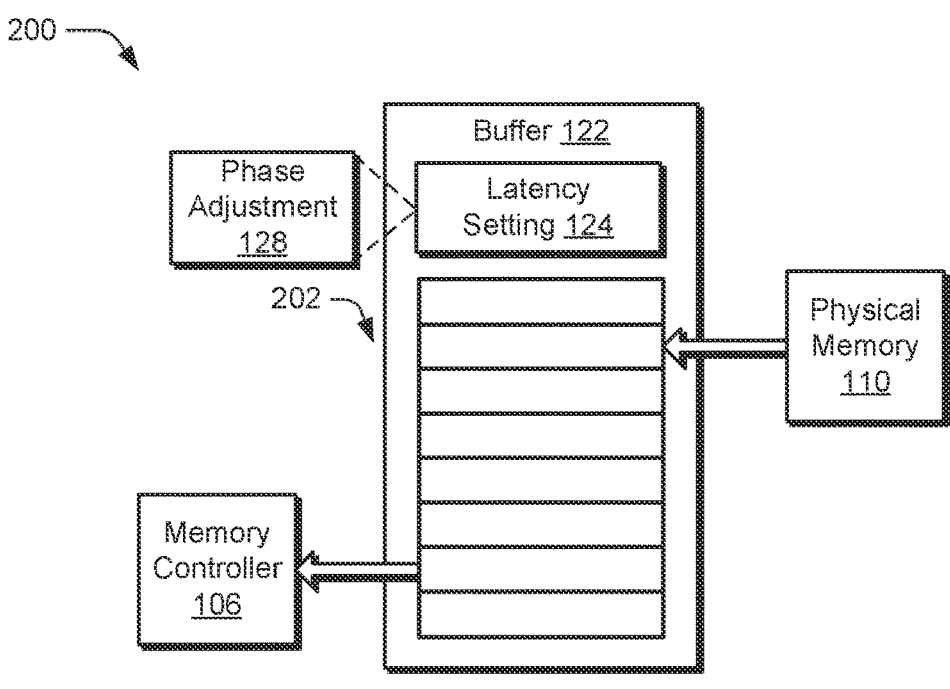
FIG. 2 depicts a non-limiting example showing operation of a buffer of FIG. 1 in greater detail.

FIG. 2 depicts a non-limiting example 200 showing operation of the buffer 122 of FIG. 1 in greater detail. The buffer 122 for instance, is configured to maintain a plurality of entries 202 as received from the physical memory 110 via the second clock domain 120. The latency setting 124 is then used by the buffer 122 to control when this data is made available (e.g., transmitted to) the memory controller 106. The latency setting 124, for instance, defines a maximum read latency defined in the first clock domain 118 as a minimum wait time before data in the buffer 122 is made available to the memory controller 106.

The memory controller 106, for instance, is configurable to receive a predefined amount of data in response to a read operation, e.g., four bits. Failure to provide this amount of data causes errors and inefficiencies in repeated requests to correct these errors. Accordingly, in conventional scenarios the latency setting is defined to include an additional amount (e.g., a single clock cycle in the slower first clock domain) to ensure this data in the buffer is ready to be consumed by the memory controller. This is performed in conventional scenario due to a lack of insight into phase alignment information between the domains, and thus an entirety of a cycle in the slower domain (e.g., a single clock cycle) is added to the latency setting to reduce errors. However, this introduces additional read latency and hinders device performance.

Accordingly, the physical layer 108 is configured to include a phase adjustment module 126 as depicted in FIG. 1 that is representative of functionality to detect phase alignment. From the detected phase alignment, the phase adjustment module 126 generates a phase adjustment 128 that is configured to adjust edges of the first clock domain 118 with edges of the second clock domain 120.

Figure 3:
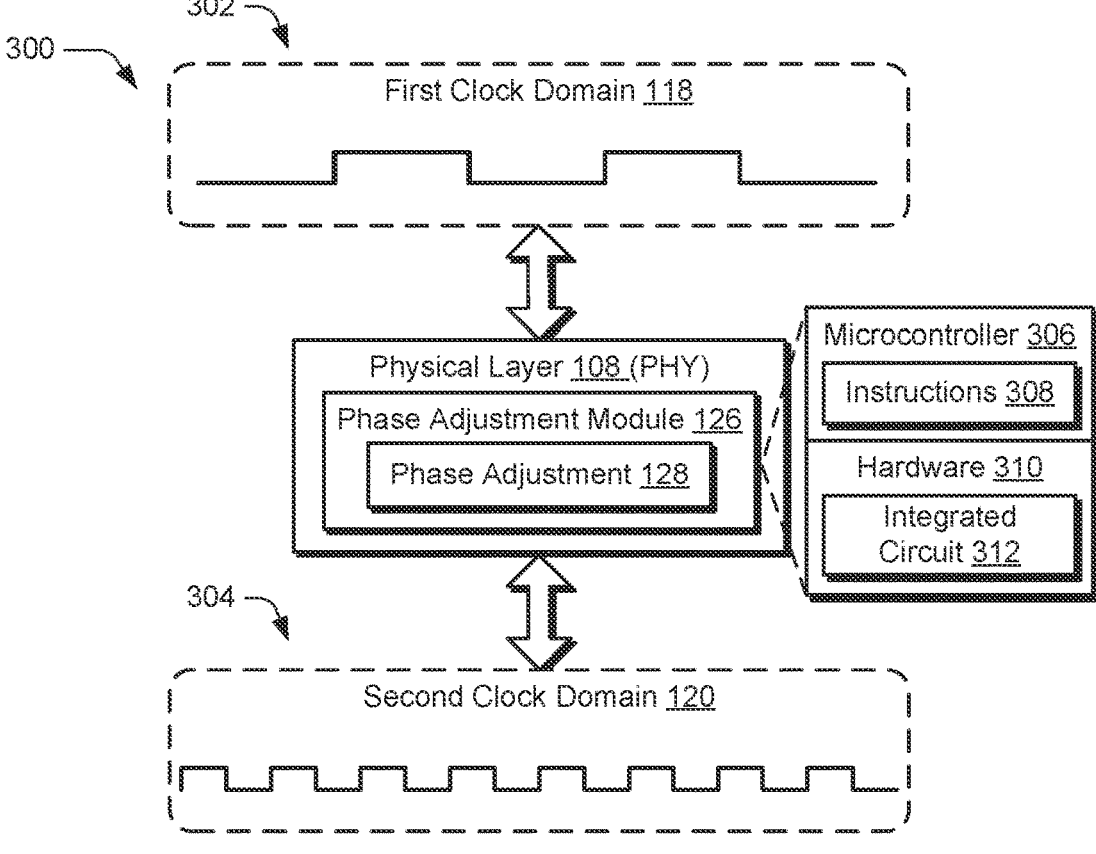
FIG. 3 depicts a non-limiting example of calculation of a phase adjustment by a phase adjustment module to align edges of clock signals between first and second clock domains.

FIG. 3 depicts a non-limiting example 300 of calculation of a phase adjustment 128 by the phase adjustment module 126 to align edges of clock signals between the first and second clock domains 118, 120 through use of a phase adjustment 128. The phase adjustment module 126 of the physical layer 108 is implemented in any of hardware, software, firmware, or a combination thereof. In one example, the phase adjustment module 126 is configured as a microcontroller 306 configured to execute instructions 308 to implement a special purpose machine usable to aligning edges of clock signals as discussed above and below. In another example, the phase adjustment module 126 is implemented using hardware 310 (e.g., as an integrated circuit such as an Application Specific Integrated Circuit (ASIC)) to perform a variety of the operations for managing or controlling clock signal alignment as discussed above and below.

One example of operations implemented by the phase adjustment module 126 includes alignment of first and second clock signals 302, 304. The first clock domain 118 is illustrated as including a first clock signal 302. Likewise, the second clock domain 120 is illustrated as including a second clock signal 304. As illustrated, the second clock signal 304 has a faster rate than a rate of the first clock signal 302. In this example, the second clock signal 304 of the second clock domain 120 is fixed, and therefore, the phase adjustment 128 is used to align an edge of the first clock signal 302 to an edge of the second clock signal 304, i.e., such that the phases of these signals at least partially coincide, one to another. This is performable by the phase adjustment module 126 in a variety of ways.

Figure 4:
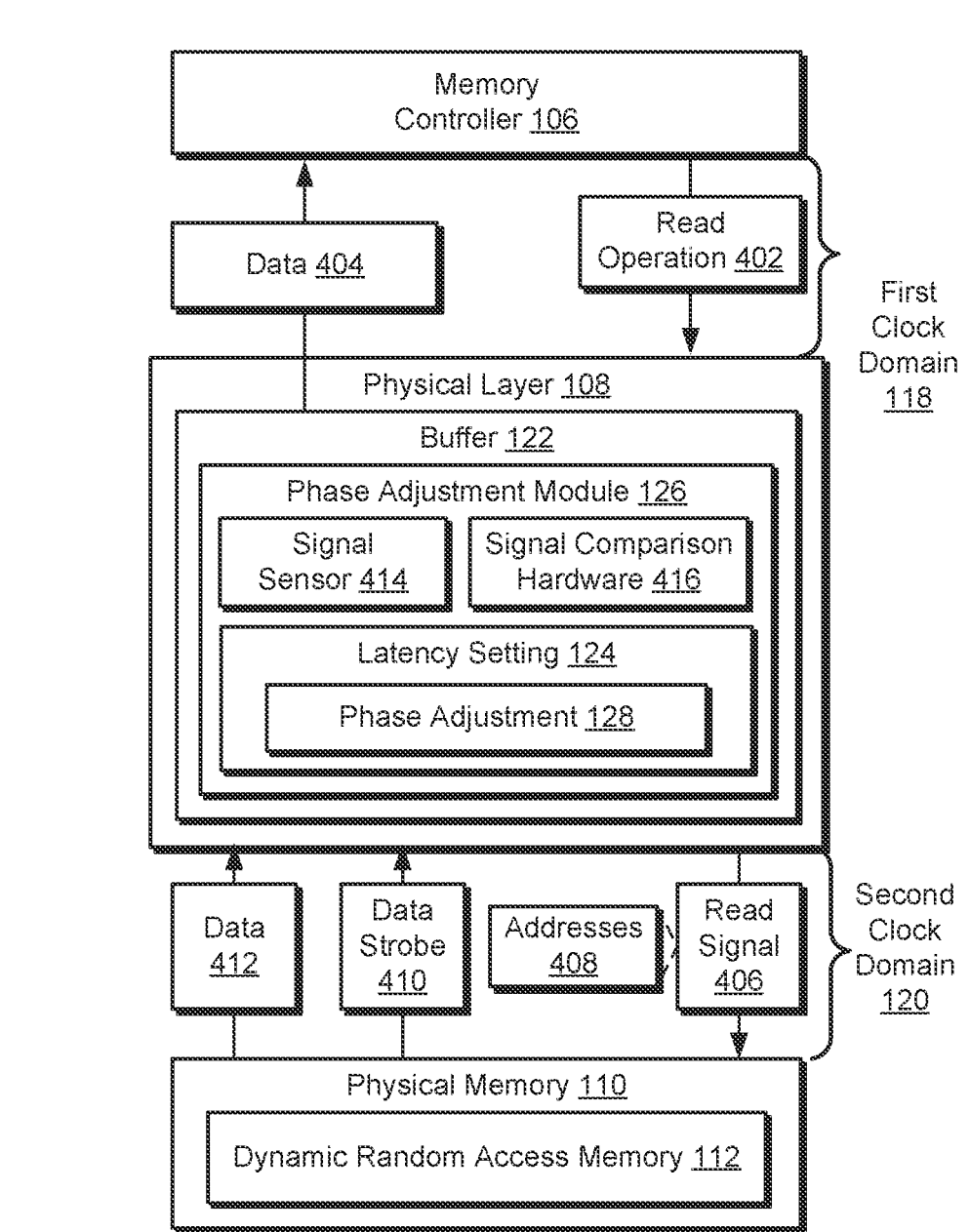
FIG. 4 depicts a non-limiting example of a system showing operation of a phase adjustment module of FIG. 1 based on a series of adjustments to a read operation.

FIG. 4 depicts a non-limiting example of a system 400 showing operation of the phase adjustment module 126 based on a series of adjustments to a read operation. Although functionality of the phase adjustment module 126 in this example is illustrated as implemented within the physical layer 108 (e.g., the buffer 122), this functionality is also configurable in a variety of other ways, e.g., as part of the memory controller 106 and so forth.

The physical layer 108 in this example receives a read operation 402 from the memory controller 106 via the first clock domain 118 and also returns data 404 that is a subject of that operation 402 within the first clock domain 118. The phase adjustment module 126 is in this example is configured to detect a mismatch in an amount of time specified by a latency setting 124 (e.g., as part of the read operation 402) and an amount of time involved in an output of the data 404 in response to the read operation. Based on this, a margin is measured that is used to adjust the latency setting 124 as the phase adjustment 128, e.g., to add the margin to the latency setting to define a subsequent latency setting for a subsequent read operation. This is performable over a plurality of iterations to dynamically adjust the phase adjustment 128 to respond to changing operational conditions, e.g., voltage, temperature, and so forth.

The phase adjustment module 126, for instance, is configured to change the phase adjustment 128 for the read operation 402 as a whole to affect round-trip latency. This change causes corresponding changes to a clock of the physical memory 110 (e.g., DRAM clock), command bus, strobe, and other signs involved in execution of the read operation 402 by the physical layer 108 and physical memory 110.

The physical layer 108, for instance, generates a read signal 406 specifying the read operation indicating addresses 408 of corresponding data that is a subject of the read operation 402. A data strobe 410 (e.g., "DQS") is a clock signal for the data lines, in which each data byte is associated with a corresponding data strobe 410. The read signal 406 is driven by the physical layer 108 to the physical memory 110. Data 412 and associated data strobe 410 are returned from the physical memory 110 to the buffer 122 of the physical layer 108 in response to the read signal 406, which is then output as data 404 to the memory controller 106. A memory protocol, for instance, dictates that "X" cycles after receiving the read signal 406, a data strobe 410 and its associated data 412 are issued from the physical memory 110 to the physical layer 108. The latency setting 124 and phase adjustment 128 are used to control "when" this data 404 is made available by the buffer 122 to the memory controller 106.

The phase adjustment module 126 in this example adjusts the phase adjustment 128 of the latency setting 124 and compares this with an amount to time to output the data 404 from the buffer 122 to detect a mismatch. In the event of a mismatch, a margin measured between these amounts of time is used as the phase adjustment 128 for a subsequent iteration of the latency setting 124. This is caused, for instance, in operation of the buffer 122 in waiting until a sufficient amount of data is received that is expected by the memory controller 106, but for which was not received in the amount of time specified by the latency setting 124. In another example, the mismatch is also detectable via errors encountered by the buffer 122 in provided the data 404 to the memory controller 106, e.g., the data 404 does not comply with expectations of the memory controller 106 and therefore causes errors.

The phase adjustment module 126 in the illustrated example includes a signal sensor 414 to detect signals and signal comparison hardware 416 to compare the signals in order to generate the phase adjustment 128. Other examples are also contemplated as shown in FIG. 3 in which signal detection is performed using a signal sensor 414 and the comparison is performed by the phase adjustment module 126 through execution of instructions 308 by a microcontroller 306.

In this way, the phase adjustment module 126 is configured to use the phase adjustment 128 to adjust the latency setting 124 until a setting a reached that aligns the clock signals of the different clock domains to each other. Thus, in this example the phase adjustment module 126 is implemented without changes being made to underlying hardware of the physical layer 108. FIG. 4 depicts a scenario involving read latency being minimized through adjustments by the phase adjustment module 126 with feedback from a data mismatch, which minimizes read data first-in/first-out buffer latency. Another example is also contemplated involving a change to the memory controller 106 in order to detect phase relationships of the first clock domain 118 with the second clock domain 120 directly, further discussion of which is included in the following discussion and shown in corresponding figures.

Figure 5:
FIG. 5 depicts a non-limiting example of a system showing operation of the phase adjustment module of FIG. 1 as including a phase detector implemented in hardware.
Figure 6:
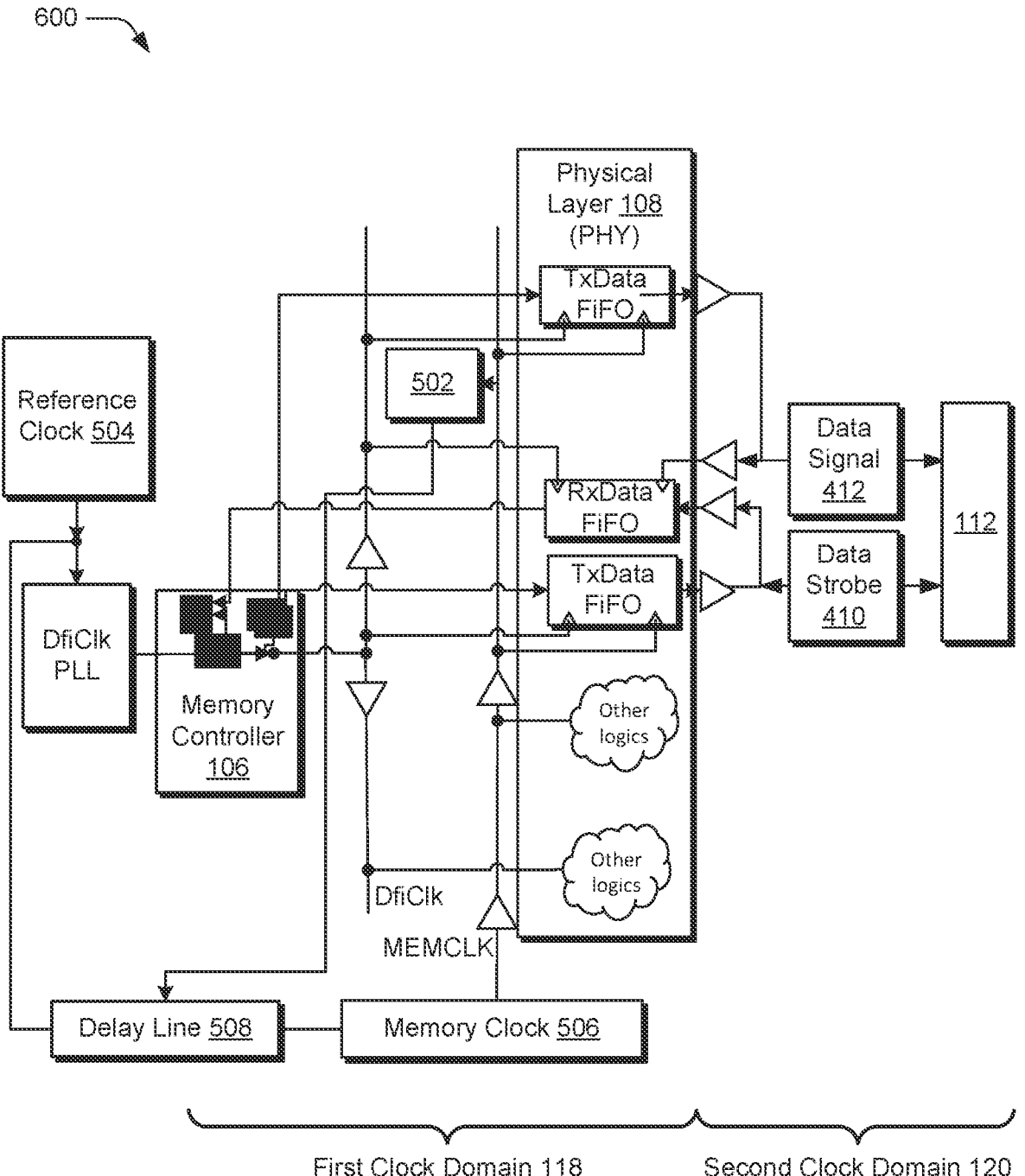
FIG. 6 depicts a non-limiting example of showing operation of the system of FIG. 5 in greater detail as implementing a delay line and phase detector.

FIGS. 5 and 6 describe a non-limiting scenario of a read/write command first-in/first-out buffer and reduction in latency of a write data first-in/first-out buffer by aligning first and second clock edges in collaboration of a phase detector and delay line. FIG. 5 depicts a non-limiting example of a system 500 showing operation of the phase adjustment module 126. This example also includes a memory controller 106, physical layer 108, and physical memory 110 (e.g., dynamic random access memory 112) as before. In this example, the signal sensor 414 of FIG. 4 is implemented as a phase detector 502 is implemented in hardware of the physical layer 108 as part of the phase adjustment module 126. The phase detector 502 is configured to operate at the second clock domain 120 to detect a phase relationship of the first clock domain 118 with respect to the second clock domain 120.

The system 500, for instance, includes a reference clock 504 outputting a reference clock signal to the memory controller 106, e.g., directly or indirectly through use of a phase-locked loop. The memory controller 106 then operates and communicates with the physical layer 108 in a first clock domain 118. A memory clock 506 is also utilized in this example to set a clock rate within the second clock domain 120. The memory clock 506, for instance, is set based on the reference clock 504, the rate of which is also adjusted using a phase-locked loop to set a clock rate of the second clock domain 120.

A delay line 508 is usable by the phase adjustment module 126 to implement a phase adjustment 128 of the latency setting 124. In this way, the phase adjustment module 126 measures a margin (e.g., as phase margin information between edges of the clock signals using signal comparison hardware 416 and/or through execution of the microcontroller 306) and uses the margin to set the phase adjustment 128. This is also performable dynamically to adjust to changing device operation conditions, e.g., voltage, temperature, and so forth. In this way, use of the phase adjustment 128 reduces memory operation latency and improves overall device 102 operation.

FIG. 6 depicts a non-limiting example of a system 600 showing operation of the system 500 of FIG. 5 in greater detail as implementing the delay line 508 and phase detector 502. This example includes use of phase-locked loops as part of implementing clock signals from the reference clock 504 and for the memory clock 506.

FIG. 7 depicts a procedure 700 in an example implementation of clock domain phase adjustment for memory operations.

A mismatch is detected as occurring in data output by a buffer to a memory controller with respect to a latency setting used to control data output from the buffer (block 702). By way of example, the phase adjustment module 126 detects the mismatch based on "round-trip" latency involving a read operation 402 and data 404 output in response to the read operation as described in FIG. 4.

A subsequent latency setting of the buffer is set based on a phase adjustment as a margin calculated between the latency setting and the data output (block 704). By way of example, the phase adjustment module 126 detects a margin between the latency setting 124 (with corresponding phase adjustment 128) and an amount of time taken to output the data 404. This difference is used to calculate the margin.

Subsequent data output is controlled of the buffer to the memory controller based on the subsequent latency setting (block 706). By way of example, the phase adjustment module 126 sets a subsequent latency setting to be used for a subsequent read operation based on the margin, e.g., by adding the margin to the previous latency setting. A variety of other examples are also contemplated.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the device 102) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A device comprising:
a physical memory communicatively coupled to a physical layer via a first clock domain;
a memory controller communicatively coupled to the physical layer via a second clock domain that is different than the first clock domain;
a buffer implemented in the physical layer between the physical memory and the memory controller, the buffer having a latency setting that that specifies an amount of time between the memory controller issuing a memory operation involving data stored in the physical memory and output of the data from the buffer, the buffer configured to;
detect a mismatch of the latency setting relative to an actual output, from the buffer, of the data involved in the memory operation;
set a phase adjustment for the latency setting between the first and second clock domains, the phase adjustment based on the mismatch; and
align an edge of a clock signal in the first clock domain with an edge of a clock signal in the second clock domain by modifying the latency setting using the phase adjustment.

2. The device of claim 1, wherein, the data output by the buffer to the memory controller occurs in the second clock domain, and the amount of time specified by the latency setting is an amount of time before outputting data in the second clock domain from the buffer to the memory controller.

3. The device of claim 1, wherein the buffer is configured to change the phase adjustment and detect whether the mismatch has occurred over a plurality of iterations.

4. The device of claim 1, wherein the buffer is configured to measure a margin based on a comparison between the amount of time specified by the latency setting and an amount of time between issuance of the memory operation and the actual output of the data from the buffer.

5. The device of claim 4, wherein the buffer is configured to add the margin as a phase adjustment as part of a subsequent latency setting based on detection of the mismatch.

6. The device of claim 1, wherein the second clock domain has a clock speed that is greater than a clock speed of the first clock domain.

7. The device of claim 1, wherein the second clock domain is fixed and the phase adjustment as part of the latency setting is configured to align the first clock domain with the second clock domain.

8. The device of claim 1, wherein the phase adjustment is configured to align an edge of a clock signal in the first clock domain with an edge of a clock signal in the second clock domain as part of the latency setting.

9. The device of claim 1, wherein the buffer is implemented as a first-in, first-out buffer.

10. The device of claim 1, wherein the physical memory is configured as a dynamic random access memory.

11. A device comprising:
a physical memory communicatively coupled to a physical layer via a first clock domain;
a memory controller communicatively coupled to the physical layer via a second clock domain; and
a buffer implemented in the physical layer between the physical memory and the memory controller, the buffer configured to:

detect a phase relationship of the first clock domain to the second clock domain;

set a latency setting that specifies an amount of time between the memory controller issuing a memory operation involving data stored in the physical memory and output of the data from the buffer to the memory controller, wherein the latency setting is set using a phase adjustment generated based on the phase relationship, the phase adjustment generated based on a mismatch of the latency setting relative to an actual output, from the buffer, of the data involved in the memory operation; and align an edge of a clock signal in the first clock domain with an edge of a clock signal in the second domain by modifying the latency setting using the phase adjustment.

12. The device of claim 11, the buffer including a phase detector implemented in hardware of the physical layer and operational in the first clock domain to detect the phase relationship.

13. The device of claim 11, wherein the phase adjustment is configured to align an edge of a clock signal in the first clock domain with an edge of a clock signal in the second clock domain.

14. The device of claim 11, wherein the buffer is implemented as a first-in, first-out buffer and the physical memory is configured as dynamic random access memory.

15. The device of claim 11, wherein the second clock domain is fixed and the phase adjustment is configured to align the first clock domain with the second clock domain.

16. A method comprising:

detecting a mismatch has occurred in data output by a buffer to a memory controller with respect to a latency setting used to control data output from the buffer, the buffer implemented in a physical layer that communicatively couples a first clock domain used by the memory controller with a second clock domain used by physical memory, the buffer between the physical memory and the memory controller, the latency setting specifying an amount of time between the memory controller issuing a memory operation involving data stored in the physical memory and output of the data from the buffer;

setting a subsequent latency setting of the buffer based on a phase adjustment as a margin calculated between the latency setting and the data output, the phase adjustment based on a mismatch of the latency setting relative to an actual output, from the buffer, of the data involved in the memory operation;

aligning an edge of a clock signal in the first clock domain with an edge of a clock signal in the second clock domain by modifying the latency setting using the phase adjustment; and controlling subsequent data output of the buffer to the memory controller based on the subsequent latency setting.

17. The method of claim 16, wherein the mismatch is based on a lack of a threshold number of items in the buffer as available for output to the memory controller in response to a read operation from the memory controller, the memory controller configured to receive the data output from the buffer and manage data transfer to a processing unit.

18. The method of claim 16, wherein the subsequent latency setting is set by adding the margin to the latency setting.

19. The method of claim 16, wherein the second clock domain has a clock speed that is greater than a clock speed of the first clock domain.

20. The method of claim 16, wherein the buffer is implemented as a first-in, first-out buffer and the physical memory is configured as dynamic random access memory.

* * * * *